United States Patent [19]

Schmidt

[11] 3,714,527

[45] Jan. 30, 1973

[54] INTEGRATED MONOLITHIC SEMICONDUCTOR CIRCUIT WITH CONTROLLED CRYSTAL TEMPERATURE

[75] Inventor: Heiner Schmidt, Kielortplatz, Germany

[73] Assignee: U. S. Philips Corporation, New York, N.Y.

[22] Filed: July 12, 1971

[21] Appl. No.: 161,505

[30] Foreign Application Priority Data

July 29, 1970 Germany....................P 20 37 636.7

[52] U.S. Cl.................317/235 R, 307/310, 73/339, 219/216

[51] Int. Cl...........................H01l 11/00, H01l 15/00

[58] Field of Search............317/234, 1, 1.5, 5.4, 235, 317/29, 29.1; 73/339; 219/216, 20; 307/310

[56] References Cited

UNITED STATES PATENTS

| | | | |
|---|---|---|---|
| 3,502,997 | 3/1970 | Narud et al. | 317/235 |
| 3,560,866 | 2/1971 | Haines | 317/235 |
| 3,566,690 | 3/1971 | Ebrahimi | 317/235 |
| 3,596,115 | 7/1971 | Conzelmann | 317/235 |
| 3,600,650 | 8/1971 | Obenhaus | 317/235 |
| 3,614,480 | 10/1971 | Berglund | 317/235 |

*Primary Examiner*—John W. Huckert
*Assistant Examiner*—Andrew J. James
*Attorney*—Frank R. Trifari

[57] ABSTRACT

An integrated monolithic semiconductor circuit with a controlled crystal temperature includes a heat generating circuit element, a temperature sensor for the temperature sensing in the body, a plurality of temperature dependent circuit elements arranged symmetrically about a circle and at least one heat generating circuit element arranged symmetrically with respect to the circle. Feedback from the temperature sensing element to the control heat generating circuit provides a stable temperature controlled arrangement. The preferred symmetrical disposition of the various circuit elements on circles makes for an economical temperature control.

9 Claims, 5 Drawing Figures

INVENTOR.

HEINER SCHMIDT
BY

AGENT

INVENTOR.
HEINER SCHMIDT
BY
AGENT

INVENTOR.

HEINER SCHMIDT
BY
AGENT

INTEGRATED MONOLITHIC SEMICONDUCTOR CIRCUIT WITH CONTROLLED CRYSTAL TEMPERATURE

The invention relates to an integrated monolithic semiconductor circuit with controlled crystal temperature, which circuit includes a controlled heat-generating circuit element (heater) accommodated in the crystal.

When using integrated semiconductor circuits, great value is set on the fact that the dependence of the electric properties of the circuit upon the ambient temperature and the load-dependent heat dissipation of the circuit elements of the integrated circuit is a minimum.

To minimize this dependence it is already known for the crystal temperature of an integrated monolithic semiconductor circuit to be maintained constant by means of an active temperature control circuit integrated in the same crystal. In these arrangements the crystal is mounted in an envelope having a high termal resistance (U.S. Pat. Nos. 3,308,271 and 3,383,614).

It is an object of the invention to further improve the known temperature control and to provide an integrated circuit in which the dependence of the electric properties on the heat dissipation of the circuit elements of the circuit is greatly eliminated.

According to the invention, this is achieved in that a circuit element which serves as a temperature sensor for the temperature control circuit is arranged, together with the most highly temperature-dependent circuit elements of the integrated circuit, substantially symmetrically on a circle while the circuit elements which dissipate most heat and the heat-generating circuit element are also arranged symmetrically and concentrically with respect to the center of circle.

The center of the circle may coincide with the center of the crystal surface.

According to a further embodiment of the invention, the heat-generating circuit element (heater) may either be arranged as a single element at the center of the circle or be divided into several elements located on a second circle about the center of the first mentioned circle.

Correspondingly, either the circuit element which dissipates most heat may be arranged at the center, or the plurality of circuit elements which generator most heat may be arranged on another circle about the some center. When the integrated circuit contains one circuit element, which dissipates most of the heat, this element may be divided into several sub-elements which are symmetrically arranged on the another circle.

The advantages of the arrangement according to the invention consist particularly in that the location of the most highly temperature-dependent circuit elements at points of the crystal the temperature of which varies to the smallest extent causes the overall temperature dependence of the integrated semiconductor circuit to be considerably reduced.

Embodiments of the invention will now be described, by way of example, with reference to the accompanying diagrammatic drawings, in which:

FIGS. 1 to 3 are schematic top plan views of the crystals of integrated monolithic semiconductor circuits with controlled crystal temperature. Each of these FIGS. 1–3 shows a possible relative arrangement of a heat-generating circuit element (heater) 4 and of heat-dissipating circuit elements 3.

Figure 1:
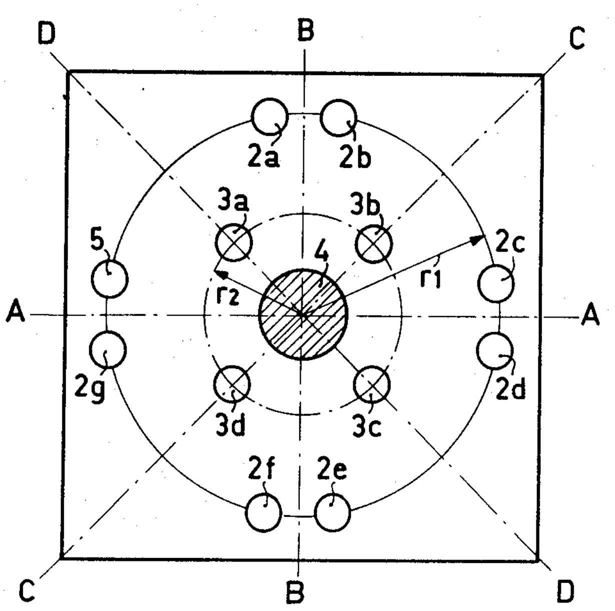
FIGS. 1 to 3 are top plan views of the crystals of schematically shown integrated semiconductor circuits according to three different embodiments of the invention.

In the embodiment shown in FIG. 1, the heat-generating circuit element (heater) is located at the center of the crystal surface. The circuit elements 3*a* to 3*d* which dissipate most heat are arranged, either on or symmetrically with respect to the symmetry axes A—A, B—B, C—C and D—D of the crystal surface, on a circle of radius $r_2$ about the center of the crystal surface. The radius $r_2$ may be greater than, equal to or smaller than the radius $r_1$ of a circle on which are arranged the most highly temperature-dependent circuit element 2*a* to 2*g* and a temperature sensor 5. Preferably, the circuit is designed so that the heat dissipated by the elements 3*a* to 3*b* is evenly distributed.

Figure 2:
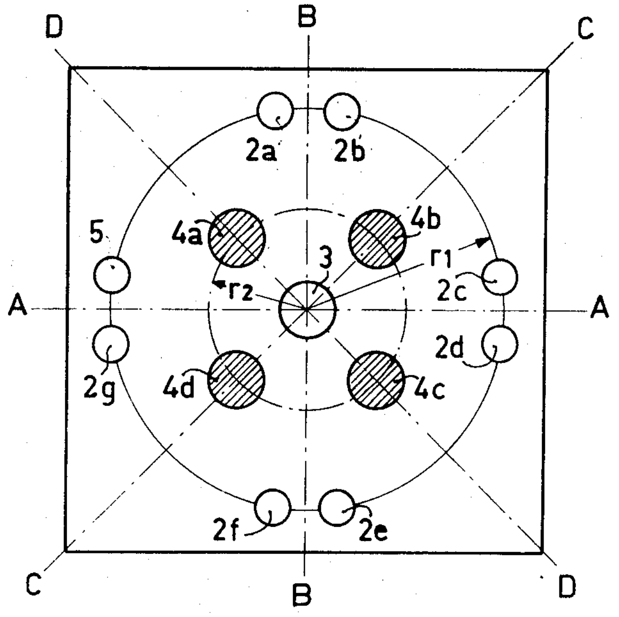

In the embodiment shown in FIG. 2, the circuit element 3, which dissipates most heat, is arranged at the center of the crystal surface. The heat-generating circuit element (heater) 4 comprises a plurality of subelements 4*a* to 4*d* which are arranged, either symmetrically to or on the symmetry axes A—A, B—B, C—C and D—D of the crystal surface, on a circle of radius $r_2$ about the center of the crystal surface. The most highly temperature-dependent circuit elements 2*a* to 2*g* and the temperature sensor 5 also are arranged symmetrically with respect to the symmetry axes A—A and B—B of the crystal surface on a circle of radius $r_1$ about the center of the crystal surface. This radius $r_1$ may be greater than, equal to or smaller than the radius $r_2$.

Figure 3:
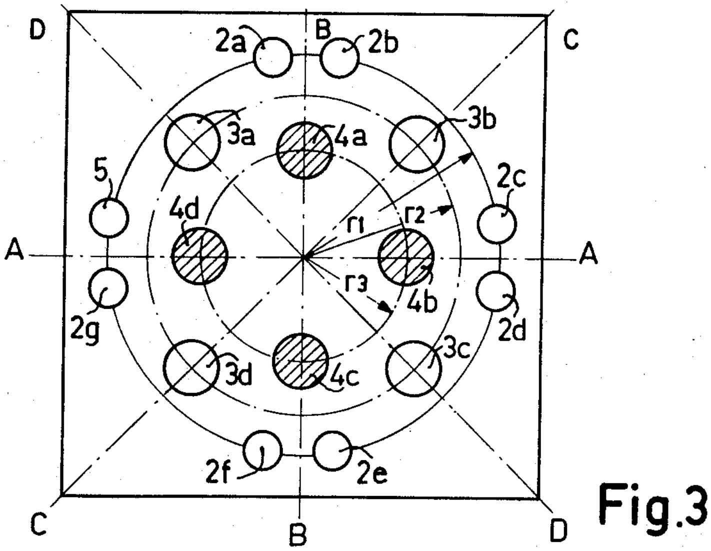

In the embodiment shown in FIG. 3, both the circuit elements 3*a* to 3*d* which dissipate most heat and the sub-elements 4*a* to 4*d* which together form the heat dissipating circuit element (heater) are arranged, either on or symmetrically with respect to the axes of symmetry A—A, B—B, C—C and D—D of the crystal surface, on circles of radii $r_3$ and $r_2$ respectively. In this embodiment also, the arrangement preferably is such that the heat dissipation and the heat generation are eveny distributed between the elements and sub-elements respectively. Both the radius *r*3 and the radius *r*2 may be greater than, equal to or smaller than the radius *r*1 of the circle on which are arranged, also symmetrically with respect to the symmetry axes A—A and B—B of the crystal surface, the most highly temperature-dependent circuit elements 2*a* to 2*g* and the temperature sensor 5.

The arrangement described of the circuit elements on the crystal surface enables an even temperature distribution to be obtained, with the result that the most highly temperature-dependent circuit elements are subject to minimum temperature fluctuations only, with a consequent small dependence of the electrical properties of the integrated circuit on its operational condition, i.e., on the load imposed on it.

Figure 5:
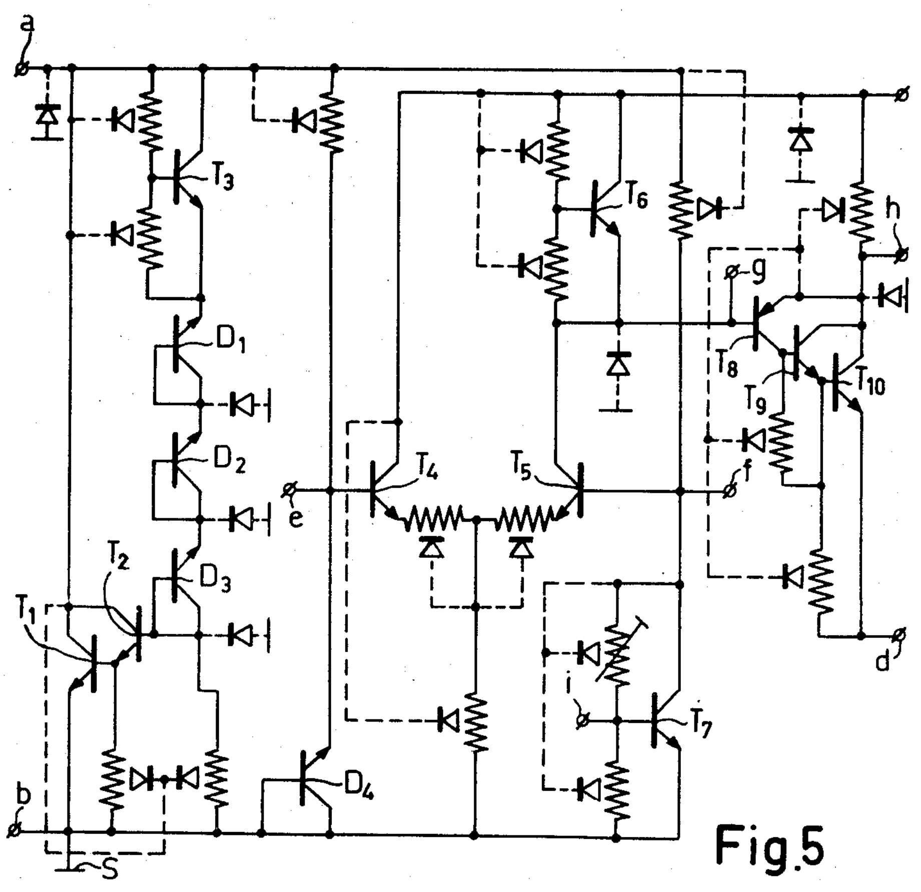
FIG. 5 is the circuit diagram of the semiconductor circuit shown in FIG. 4.
Figure 4:
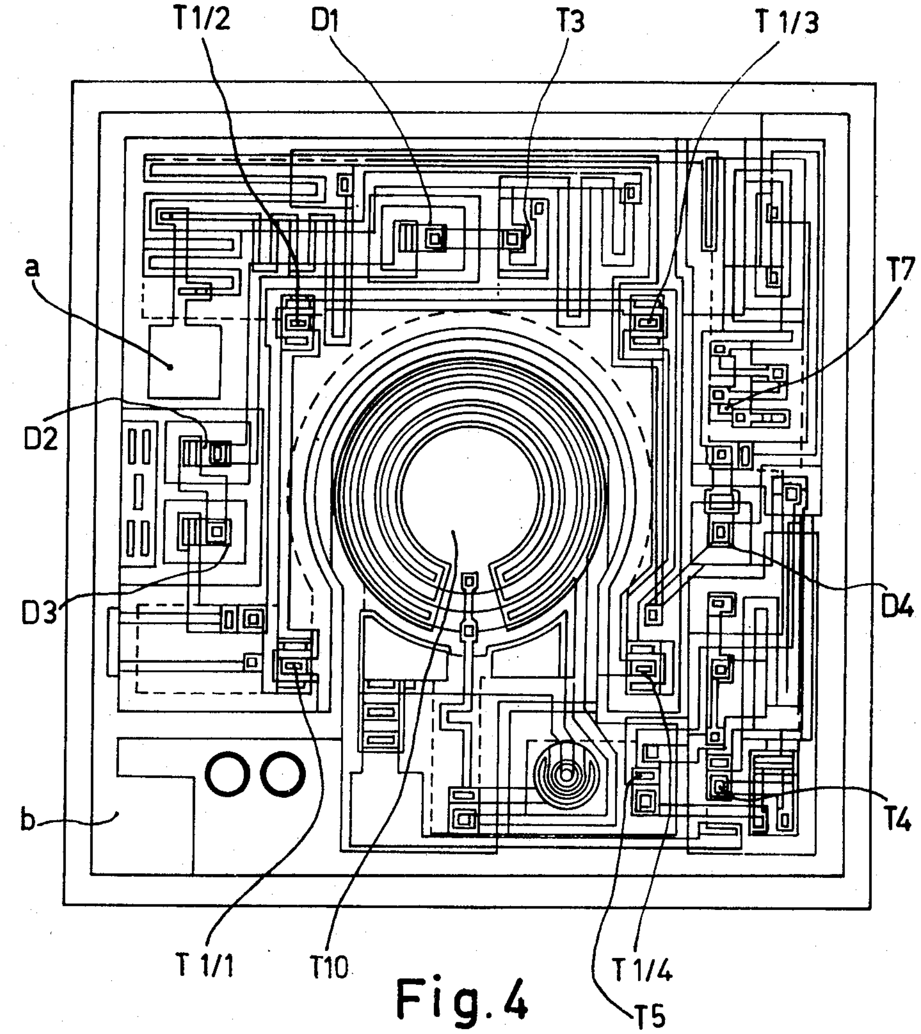
FIG. 4 is a top plan view of the crystal of a practical embodiment of a semiconductor circuit according to the invention which corresponds to the schematic representation shown in FIG. 1.

FIG. 4 is a top plan view of a crystal of a practical embodiment of an integrated circuit according to the invention, the circuit diagram of which is shown in FIG. 5.

The integrated circuit is a voltage stabilizer to be operated as a two-terminal device which maintains constant the voltage across terminals *a* and *b* through which it is supplied with a given current. The circuit arrangement comprises transistors $T_1$ to $T_3$ and diodes $D_1$ to $D_3$.

In order to reduce the temperature dependence of the stabilized voltage, the integrated circuit is completed by a temperature control circuit comprising transistors $T_4$ to $T_{10}$ and a diode $D_4$. The circuit elements are located on the crystal surface according to the arrangement shown in FIG. 1. The transistor $T_{10}$, which acts as the heater, is located at the center of the square crystal having sides of 1.1 mm.

In the circuit arrangement from which temperature influences are to be removed, the circuit element which dissipates most heat (in fluctuating amounts), the transistor $T_1$, is divided into four component transistors $T_1/1$ to $T_1/4$ which are arranged on a circle around the heater $T_{10}$. The circuit elements the influence of which on the behavior of the circuit arrangement is most highly temperature-dependent are arranged on both sides of, and close to, the symmetry axes of this arrangement, which are shown by broken lines, and outside of the circle 4. These circuit elements are the diodes $D_1$ to $D_3$ and the transistor $T_3$ of the voltage-stabilizing circuit and the transistor $T_7$ and the diode $D_4$ of the control amplifier which controls the heater $T_{10}$. The diode $D_4$ of the control amplifier serves as a reference element, while the transistor $T_7$ serves as a measuring sensor and, via a differential amplifier comprising the transistors $T_4$ and $T_5$, controls the heater in accordance with the temperature at the location of the transistor $T_7$. These two elements also are arranged on the circle about the heater $T_{10}$.

Thus, the temperature at the location of the transistor $T_7$ and hence the temperature on both sides of the symmetry axes is maintained constant, the arrangement of the component transistors which together form the transistor $T_1$ being such that the influence of the heat transfer of this transistor on the temperature of the locations on the crystal is a minimum.

I claim

1. An integrated monolithic semiconductor circuit with controlled temperature comprising a semiconductor body, at least one controlled heat generating circuit element in the body, a control circuit element in the body for temperature sensing, means to couple the control circuit element to the controlled heat generating circuit for maintaining the temperature of the body, a plurality of temperature dependent circuit elements in the body, said control circuit element and said plurality of temperature dependent circuit elements being located symmetrically about a first circle, and at least one heat dissipating circuit element in the body, said heat dissipating circuit element and said controlled heat generating circuit element being located in the body symmetrically with respect to the first circle.

2. An integrated semiconductor circuit as claimed in claim 1, wherein the controlled heat generating circuit element is located at the center of the first circle and a plurality of heat dissipating circuit elements are arranged symmetrically around a second circle concentric with the first and also with respect to orthogonal axes through the center of the circles.

3. An integrated semiconductor circuit as claimed in claim 1, wherein the controlled heat generating circuit element comprises a plurality of sub-elements, the plurality of sub-elements being located symmetrically about a second circle and also being located symmetrically with respect to orthogonal axes through the center of the circles, said second circle being concentric with said first circle, said plurality of temperature dependent circuit elements also being located symmetrically with respect to said orthogonal axes.

4. An integrated semiconductor circuit as claimed in claim 3, wherein said second circle is smaller than said first circle, and said heat dissipating element is located at the center.

5. An integrated semiconductor circuit as set forth in claim 3, wherein a plurality of dominant heat dissipating elements are provided located on a third concentric circle intermediate that of the first and second circles.

6. An integrated semiconductor circuit as claimed in claim 3, wherein a plurality of heat dissipating circuit elements are provided in the body located on a third concentric circle, said third circle being greater than said second circle, and said first circle is one of smaller and larger radius with respect to that of said second and said third circles.

7. An integrated semiconductor circuit as claimed in claim 3, wherein two of the first, the second and the third circles are equal to each other.

8. An integrated semiconductor circuit as claimed in claim 1, wherein said coupling means comprises a temperature control circuit, said temperature control circuit being located on the first circle.

9. An integrated monolithic semiconductor circuit with controlled crystal temperature comprising a semiconductor body, a controlled heat generating circuit element in the body, a control circuit element in the body for temperature sensing, means to couple the control circuit element to the control heat generating circuit element for maintaining the temperature of the body, a plurality of temperature dependent circuit elements in the body, said control circuit element and said plurality of temperature dependent circuit elements being located symmetrically about a first circle, a plurality of heat dissipating circuit elements in the body, and a dominant heat dissipating circuit element in the body which dissipates more heat than the other heat dissipating circuit elements, said plurality of heat dissipating circuit element being located symmetrically about a second circle concentric with the first circle, the dominant heat dissipating circuit element being located at the center of the first circle.

* * * * *